United States Patent
Li et al.

(10) Patent No.: US 6,360,204 B1
(45) Date of Patent: Mar. 19, 2002

(54) METHOD AND APPARATUS FOR IMPLEMENTING ROUNDING IN DECODING AN AUDIO SIGNAL

(75) Inventors: Shipeng Li, Princeton; Richard Gerald Branco, Westmont, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/238,562

(22) Filed: Jan. 28, 1999

Related U.S. Application Data (60) Provisional application No. 60/082,929, filed on Apr. 24, 1998.

(51) Int. Cl.[7] .............................. H04B 1/66; H04N 7/24; G06F 7/38
(52) U.S. Cl. ........................ 704/500; 704/503; 708/551
(58) Field of Search ................................ 704/500, 503; 708/551, 552

(56) References Cited

U.S. PATENT DOCUMENTS 6,029,017 A1 * 3/2001 Lim et al. .................... 708/552

OTHER PUBLICATIONS

Ted Painter and Andreas Spanias, "A Review of Algorithms for Perceptual Coding of Digital Audio Signals," Proc. 1997 13th International Conference on Digital Signal Processing, vol. 1, p. 179–208, Jul. 1997.*

Il–Taek Lim et al: Fixed–Point Analysis and Simulations of AC–3 Algorithm 1997 IEEE ASSP Workshop on Applications of Signal Processing to Audio and Acoustics, New Paltz, NY Oct. 19–22, 1997 p. 4 pp XP002111193 1997, NY, NY IEEE, USA9SBN abstract paragraph 0003 figures 1,3.

Patent Abstracts of Japan vol. 016, No. 463 (P–1428), Sep. 25, 1992 & JP 04 165422 A (Fujitsu Ltd; Others: 01) Jun. 11, 1992.

DE 198 39 627 A (LG Electronics Inc). Mar. 4, 1999 abstract claims 1–8 figures 3–5–8–.

EP 0 469 841 A (Matsushita Electric Ind Co Ltd) Feb. 5, 1992 abstract figure 1.

Davidson G et al: "A Lowcost–Adaptive Transform Decoder Implementation for High Quality Audio" Speech Processing 2, Audio, Neural Networks, Underwater Acoustics, San Francisco, Mar. 23–26, 1992, vol. 2, No. Conf. 17, Mar. 23, 1992 pp. 193–196, XP000356970 IEEE ISBN; 0–7803–0532–9.

Patent Abstracts of Japan vol. 015 No. 295 (E–1094), Jul. 26, 1991 & JP 03 104310 A (Matsushita Electric Ind Co Ltd), May 1, 1992 Abstract.

PCT Search Report for our reference SAR 12949 Application No. PCT/US99/08508 filing date Apr. 23, 1999.

* cited by examiner

Primary Examiner—Tālivaldis Ivars Šmits
(74) Attorney, Agent, or Firm—William J. Burke (57) ABSTRACT

A rounding method to increase the precision of an audio decoder during arithmetic and/or shifting operations is disclosed. The most significant bit of the discarded bits is evaluated for a rounding up operation.

14 Claims, 4 Drawing Sheets

METHOD AND APPARATUS FOR IMPLEMENTING ROUNDING IN DECODING AN AUDIO SIGNAL

This application claims the benefit of U.S. Provisional Application No. 60/082,929 filed Apr. 24, 1998, which is herein incorporated by reference.

The invention relates to an apparatus and a concomitant method for decoding an audio signal. More particularly, the invention relates to a method for increasing the precision of arithmetic operations that are performed in the course of decoding an audio signal.

BACKGROUND OF THE DISCLOSURE

As the demand for digital information proliferates, digital audio signal has become an indispensable part in digital video applications. Such demand for digital audio signal is evidenced by the incorporation of digital audio requirements in various well-known standards, e.g., the AC-3 standard for DVD and ATSC (Advanced Television Systems Committee) digital video applications (including HDTV) and MPEG-1 and MPEG-2 (Moving Picture Experts Group) audio standards for DVB (European digital video standard) applications.

However, audio standards such as the AC-3 standard, generally specify a compression algorithm to produce a digital representation of an audio signal which, when decoded and reproduced, will sound the same or very similar to the original audio signal (e.g., Pulse Code Modulation (PCM) representation), while minimizing the number of bits used to represent the compressed audio representation. As such, the audio decoder plays an important role in the decoding and reproduction of the compressed audio representation.

In order to assure the quality of digital audio, both Dolby AC-3 and MPEG-1/-2 audio standards have specifications on the precision of the audio decoder. For example, Dolby classifies the AC-3 decoder into three groups, Group A, Group B and Group C, corresponding to approximately 20-bit, 18-bit and 16-bit precision, respectively. Similarly, MPEG audio decoders can be classified into "ISO/IEC 13818-3 audio decoder" and "limited accuracy ISO/IEC 13818-3 audio decoder" corresponding to different RMS and maximum absolute value of decoding errors. The ISO/IEC 13818-3 audio decoder should have approximately 16 bit precision.

Generally, if an audio decoder is implemented using a digital signal processor (DSP) having a word-width that is much larger than the required precision, then the decoding accuracy should be easily achieved. For example, using a 32-bit DSP to implement a Group C Dolby AC-3 decoder (20-bit precision) or an ISO/IEC 13818-3 audio decoder (16 bit precision) should be attainable. However, using a more powerful DSP increases cost and complexity. Namely, as the processing word-width (i.e., the number of data bits processed at a given time by the decoder hardware) of the DSP increases, the data bus will be wider accordingly. This, in turn, increases the processing delay, and increases hardware requirements such as read only memory (ROM), random access memory (RAM), arithmetic logic unit (ALU), multiplier/accumulator widths and sizes, thereby increasing the cost and power requirement of the audio decoder.

Therefore, a need exists in the art for an apparatus and concomitant method to achieve a high level of precision without the need to use a high word-width DSP.

SUMMARY OF THE INVENTION

In the present invention, the precision of an audio decoder is increased by proper rounding during arithmetic and shifting operations. Since such operations often generate results that exceed the data word-width of a processor, e.g., a DSP, bits from the results are often discarded at the expense of loss of precision (called "truncation precision loss") in reproducing the audio signal by the audio decoder. In the present invention, the most significant bit of the discarded bits is evaluated for a rounding up operation. However, prior to the application of rounding, the truncated result must first be evaluated to determine if a saturation condition exists. If a saturation condition is present, no rounding is applied.

For example, using the present invention, an audio decoder is able to achieve precision defined for Dolby AC-3 group B and group C decoder and ISO/IEC 13818-3 audio decoder by simply using a DSP processor with only 20-bit word-width. The increased precision is achieved by proper rounding during the arithmetic and shifting operations.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
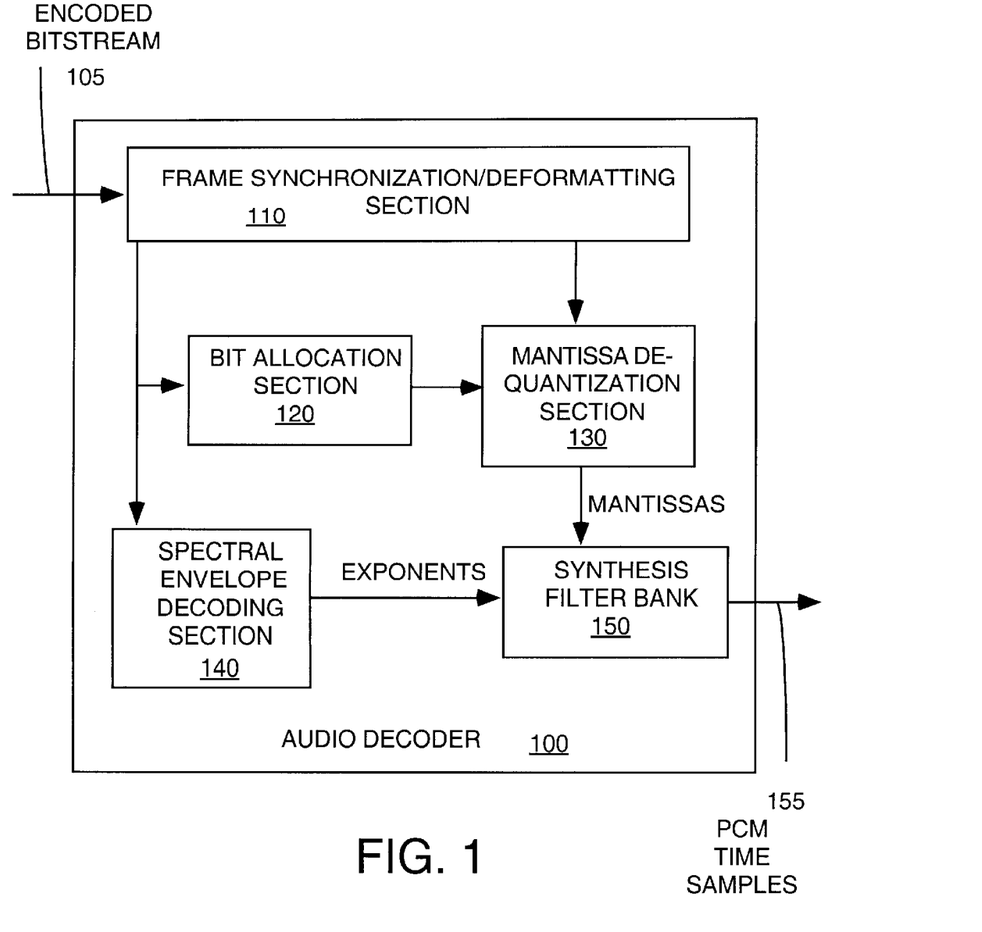
FIG. 1 illustrates a block diagram of a simplified AC-3 audio decoder.

FIG. 1 depicts a block diagram of a simplified AC-3 audio decoder. Although the present invention is described with respect to an AC-3 audio decoder, it should be understood that the present invention can be implemented in other audio decoders that are compliant in accordance with other standards.

FIG. 1 illustrates an AC-3 audio decoder 100 that comprises a frame synchronization/de-formatting section 110, a bit allocation section 120, a mantissa de-quantization section 130, a spectral envelope decoding section 140, and a synthesis filter bank 150. Since the audio decoder 100 performs the inverse functions of the audio encoder, it would assist in the understanding of these various sections of the audio decoder, if the AC-3 audio encoding method is briefly described here.

In accordance with the AC-3 standard, PCM time samples are transformed into a sequence of blocks of frequency coefficients via an analysis filter bank. Namely, overlapping blocks of time samples, e.g., 512, are multiplied by a time window and transformed into the frequency domain, where the frequency domain representation may undergo further processing such as decimation by a factor of two (2). In turn, the individual frequency coefficients are represented in binary exponential notation as a binary exponent and a mantissa. The set of exponents is encoded into a representation of the signal spectrum, known as the "spectral envelope", while the mantissa is coarsely quantized. Finally, the spectral envelope and the quantized mantissas for a number of audio blocks, e.g., six (6) blocks, are formatted together into an AC-3 audio frame.

Thus, in operation, the frame synchronization/de-formatting section 110 of the decoder must first synchronize to the encoded bitstream received on path 105 and then de-format the various types of data such as the encoded spectral envelope and the quantized mantissas. In turn, the encoded spectral envelope is passed to the spectral envelope decoding section 140, where the spectral envelope is decoded to produce the exponents, whereas the quantized mantissas are passed to the mantissa de-quantization section 130, where the mantissas are de-quantized. The bit allocation section 120 provides bit allocation information to the mantissa de-quantization section 130, thereby assisting in the unpacking and de-quantization process. Finally, the exponents and mantissas are transformed back into the time domain by the synthesis filter bank 150 to produce the decoded PCM time samples on path 155.

The various sections of the audio decoder 100 must perform numerous arithmetic or shifting operations, e.g., multiplication, division, subtraction, and/or addition, before the PCM time samples are regenerated from the encoded bitstream. As such, the various results from such arithmetic or shifting operations are representative in part or in whole (or an intermediary representation) of the encoded audio signals.

In the present invention, a rounding method is employed where truncation is necessary due to the maximum data word-width of the DSP. Namely, the data word-width of the DSP affects the manner in which these arithmetic and shifting operations are performed. For example, if the audio DSP processor has a data word-width of x-bits, e.g., 20-bit, then after each arithmetic operation, the final results are typically stored either in a 20-bit register or in a 20-bit memory cell.

To illustrate, multiplication of two 20-bit operands produces a 39-bit product. Namely, if two 20-bit binary numbers (1 bit to represent the sign of the number and 19 bits to represent the actual number), then the product should, at most, comprise a 38-bit number with one bit to present the sign of the number, i.e., a 39-bit product. However, since the DSP operates on a fixed data word-width, e.g., 20-bits, the 39-bit product is truncated to a 20-bit product. Since many arithmetic operations are performed in reproducing the PCM time samples, the loss of accuracy from these truncating steps will propagate from successive arithmetic or shifting operations, thereby ultimately causing the loss of precision in the resulting PCM time samples generated by the audio decoder. Such loss of precision will manifest itself as a degradation in the reproduced audio signals, thereby resulting in a poor evaluation for the audio decoder.

To address this criticality, one can employ a DSP that is capable of handling a longer data word-width, at the expense of greater cost, power consumption and complexity as discussed above. Similarly, the use of a floating point DSP will also address this criticality to a limited extent, but again at the expense of greater cost and complexity. Thus, the present invention provides a proper rounding method, when needed, that will reduce the loss of precision, thereby allowing the use of a lower cost DSP in an audio decoder to achieve greater precision in the reproduced audio signal.

Figure 2:
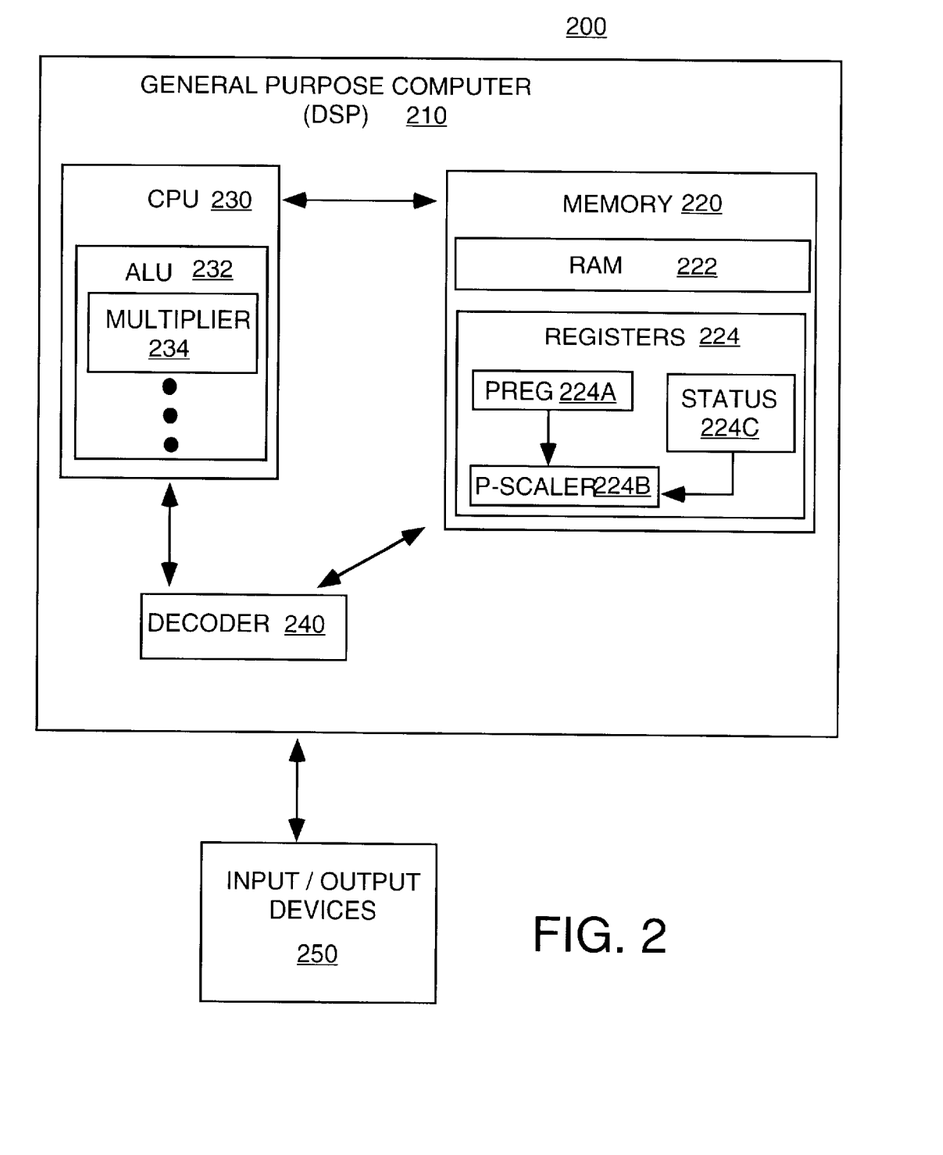
FIG. 2 illustrates a block diagram of an audio decoding system of the present invention.

FIG. 2 illustrates an audio decoding system 200 of the present invention. The audio decoding system comprises a general purpose computer or DSP 210 and various input/output devices 250. The general purpose computer comprises a central processing unit (CPU) 230, a memory 220 and an audio decoder 240 for decoding audio signals.

The memory 220 is broadly defined herein as a storage device. As such, memory 220 is illustrated as having a random access memory (RAM) 222 and/or one or more registers 224.

The computer 210 can be coupled to a plurality of input and output devices 250, such as a keyboard, a mouse, an audio recorder, a camera, a camcorder, a video monitor, a speaker, a receiver, any number of imaging devices or storage devices, including but not limited to, a tape drive, a floppy drive, a hard disk drive or a compact disk drive. The input devices serve to control or provide inputs, e.g., encoded bitstreams, to the computer, whereas the output devices serve to receive and/or present the regenerated PCM time samples.

In one embodiment, the audio decoder 240 is simply the audio decoder 100 as discussed above in FIG. 1. The audio decoder 240 can be a physical device which is coupled to the CPU 230 through a communication channel. If the audio decoder is implemented in hardware, e.g., application specific integrated circuits (ASIC), then the present rounding method can be implemented directly into any section that performs arithmetic operations.

Alternatively, the audio decoder 240 can be represented by a software application, which is loaded from a storage medium, (e.g., a magnetic or optical drive or diskette) and resides in the memory 220 of the computer. As such, the audio decoder 240 of the present invention can be stored on a computer readable medium.

More specifically, in the preferred embodiment, the general purpose computer or DSP 210 is programmed using software applications to implement the various sections of the audio decoder 100 as discussed above in FIG. 1. If an arithmetic operation is performed for any of these sections that requires a truncating step, then the present rounding method will be employed, when needed, as discussed below.

In one embodiment, the arithmetic operations are performed by an arithmetic logic unit (ALU) of the CPU. The ALU may incorporate one or more sub-units, e.g., a dedicated multiplier 234, a divisor, an adder, a subtractor (not shown) and the like. As such, if the audio decoder needs arithmetic operations to be performed, it can simply pass the data to the CPU and wait for the result to be forwarded back from the CPU. In the present invention, rounding is performed for any arithmetic operations or bit shifting operations that result in the need to truncate the results, e.g., the product, quotient, sum, difference, and the like. Namely, the next immediate least significant bit (LSB) to the last bit that is kept (i.e., the most significant bit of the bits that are truncated) is evaluated to determine if the truncated result should be rounded up.

More specifically, the rounding method is now described using an audio DSP having a data word-width of 20-bits. However, it should be understood that the present invention can be employed in any audio DSP of any data word-width.

First, scaling is optionally employed to scale the result from an arithmetic operation. Namely, an arithmetic operation may generate a result having a width that exceeds the word-width of the DSP. As such, scaling is employed to keep the most relevant portion of the result from the arithmetic operation.

Figure 4:
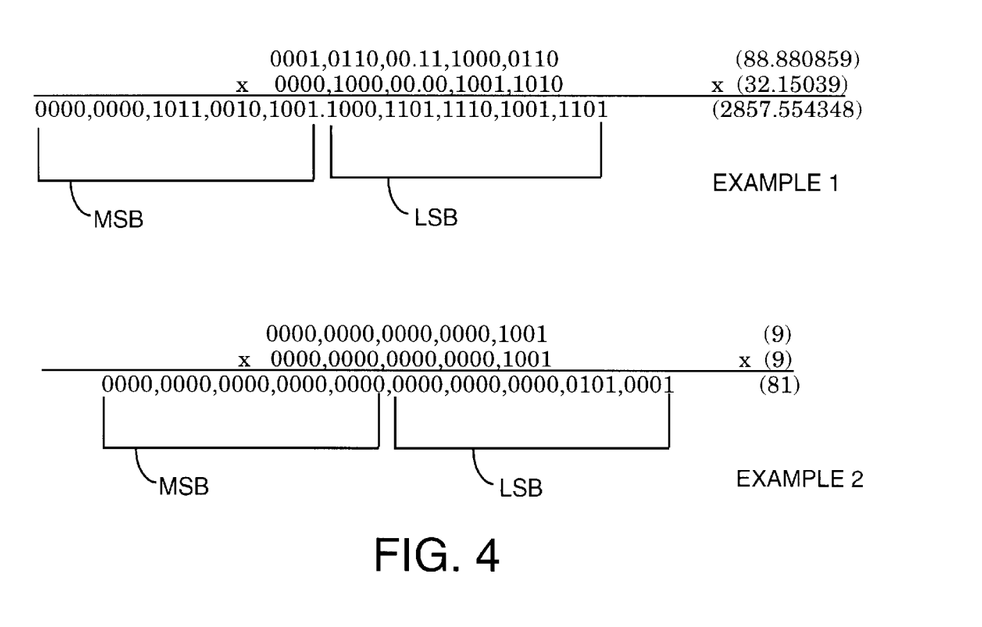
FIG. 4 illustrates two binary based multiplication examples.

To illustrate, multiplication of two 20-bit operands produces a 39-bit product. Generally, for fixed-point multiply operations, the 20 most significant bits (MSBs) of the 39-bit product are used to represent the result. This is illustrated in the first multiplication example in FIG. 4. Namely, since the most important information for a product of two non-integers are often located in the MSB, the 20 most significant bits (MSBs) of the 39-bit product are used as the result. Nevertheless, it should be noted that the dynamic range of the two 20-bit operands can be used to control the scaling operation, since operands having small values may dictate the selection of the 20 least significant bits (LSBs) instead.

In contrast, for integer multiply operations, the 20-bit LSBs are normally used to get the exact product of two integers if the product does not exceed 20 bits. This is illustrated in the second multiplication example of FIG. 4. Namely, since the most important information for a product of two integers are often located in the bits immediate to the left of the decimal point, the 20 least significant bits (LSBs) of the 39-bit product are used as the result. Again, the dynamic range of the two 20-bit operands can be used to control the scaling operation, since operands having large values, e.g., large integer values, may dictate the selection of the 20 MSBs.

Once scaling is completed, for fixed-point multiplication operations, proper rounding should be selectively performed to acquire the closest 20-bit approximation to the 39-bit product. In operation, the result from a 20-bit by 20-bit multiplication operation is stored in the PREG register 224A which has a word-width of 40 bits, numbered P39 (MSB) through P0 (LSB). The 39-bit product is stored from P38 to P0, whereas the bit P39 is used to detect overflow conditions. The 39-bit product is then scaled down to a 20-bit approximation of the 39-bit product in the P-scale register 224B, which has a word-width of 20 bits. The 39-bit product is scaled in accordance with the flags that are set in the status register 224C, which has a word-width of at least two (2) bits.

More specifically, two flags, RNDM (Rounding Mode) and PM (Product Mode) are implemented in the status register 224C to control the selection of the multiplication approximation. Namely, the RNDM flag controls whether the rounding operation should be performed when getting the 20-bit MSBs out of the 39-bit product. The PM flag controls whether the 20-bit MSBs of the 39-bit product or the 20-bit LSBs of the 20-bit product should be stored in memory to represent the product (approximation or actual) of the multiplication operation. These two flags can be set/reset under programmer control as needed via DSP instructions in accordance with Table 1.

TABLE 1

| PM | RNDM | Bit Selection & Rounding Decision |
|---|---|---|
| 0 | 0 | The lower 20 bits of the PREG register {P19, P18, ..., P0} will be transferred to an accumulator or memory. |
| 0 | 1 | The lower 20 bits of the PREG register {P19, P18, ..., P0} will be transferred to an accumulator or memory. |
| 1 | 0 | The upper 20 bits of the product in P register {P38, P37, ..., P19} will be transferred to an accumulator or memory. |
| 1 | 1 | The upper 21 bits of the product {P38, P37, ..., P19, P18} are rounded and saturated to obtain a 20-bit result T and passed to an accumulator or memory. |

As illustrated in Table 1, the present rounding method is not applied to all multiplication operations. Namely, the present invention must determine if the 20 MSBs are "saturated". Saturation is the condition where the 20 MSBs are already representing the maximum positive numerical value for a 20-bit data word-width, i.e., $\{P38, P37, \ldots, P19\}=\{0, 1, 1, \ldots, 1, 1\}$, where 0 (P38) is typically used to represent a positive sign. If rounding up is applied to a saturated positive number, then the sign of the number will be changed to a negative sign, thereby causing an overflow error. It should be noted that this condition will not affect a saturated negative number, since rounding up will cause the number to be less negative. As such, if the selected 20 MSBs are saturated, then the present rounding method is not implemented.

However, if the selected 20 MSBs are not saturated, then the present rounding method is implemented, where the bit P18 is evaluated for the purpose of rounding. Namely, if P18 has a value of 1, then the selected 20 MSBs are rounded up by a value of 1. If P18 has a value of 0, then the selected 20 MSBs are not rounded up.

The rounding and saturation method is as follows:

if $\{P38, P37, \ldots, P19\} = \{0, 1, 1, \ldots, 1, 1\}$ $T = 2^{\wedge}19 * P38 + 2^{\wedge}18 * P37 + \ldots + 2^{\wedge}0 ** P19;$ else, $T = 2^{\wedge}19 * P38 + 2^{\wedge}18 * P37 + \ldots + 2^{\wedge}0 * P19 + P18$ \hfill (1)

where T represents the 20-bit approximation of the 39-bit product.

Another source of loss of precision occurs during right-shift instructions of a fixed-point number. Namely, some operations may request that a number be shifted to the right by "n" number of bits, which is equivalent to a division by $2^n$ operation. This shifting operation may effectively discard the right most "n" number of bits. However, precision improvement can be achieved using rounding right-shift, i.e., where the MSB of the discarded bits is evaluated for rounding.

For example, assume "n" is the number of bits that need to be right-shifted and "n" is greater than 0. T is the 20-bit fixed point number to be shifted. S is an intermediary shifted result of T as defined below and "S+1" is the intermediary shifted result S plus a value of one (1). Then the rounding right-shift result R can be obtained by the following procedure:

if $n=0$, $R=T$;

else, $S=(n-1)$ bits right-shift of $T$;

if $S$ equals to $0x7fff$, then $R=1$ bit right-shift of $S$;

else $R=1$ bit right-shift of $(S+1)$ \hfill (2)

It should be noted that the third line of equation (2) is a query for detecting a saturation condition as discussed above. Namely, if a saturation condition is detected, the right-shift result R is set equal to one (1) bit right-shift of S, which is equivalent to n bits right-shift of T without rounding.

Furthermore, various standards, ATSC and MPEG, incorporate fixed-point coefficients ROM tables. As such, all the fixed-point coefficients in these table can also be rounded to x-bit, e.g., 20-bit, fixed-point number according to the rounding and saturation method described above. Such tables includes, but are not limited to:

For AC-3 standard:
Center Mix Value (Table 5.4 in the ATSC Doc. A/52),
Surround Mix Level (Table 5.5 in the ATSC Doc. A/52),
Dialogue Normalization Values (defined in section 7.6 in the ATSC Doc. A/52),
3-Level Quantization (Table 7.19 in the ATSC Doc. A/52),
5-Level Quantization (Table 7.20 in the ATSC Doc. A/52),
7-Level Quantization (Table 7.21 in the ATSC Doc. A/52),
11-Level Quantization (Table 7.22 in the ATSC Doc. A/52),
15-Level Quantization (Table 7.23 in the ATSC Doc. A/52),
Transform Window Sequence (Table 7.33 in the ATSC Doc. A/52),
512-sample IMDCT coefficient Table (zcos1 and zsin1 defined in the ATSC Doc. A/52),
256-sample IMDCT coefficient Table (zcos2 and zsin2 defined in the ATSC Doc. A/52).

For MPEG:

Layer I, II scalefactors (Table 3-B.1 in the ISO/IEC 11172-3),
Layer II classes of quantization: C table and D table (Table 3-B.4 in the ISO/IEC 11172-3),
Requantization Table 1 for Layer I ($2^{nb}/(2^{nb}-1)$),
Requantization Table 2 for Layer I ($2^{(-nb+1)}$),
Coefficients D of the synthesis window (Table 3-A.2 in the ISO/IEC 11172-3).

It should be noted that for the MPEG case, the C table for layer II classes of quantization and Requantization Table 1 for Layer I ($2^{nb}/(2^{nb}-1)$) are first subtracted by 1, then the reminders are then scaled, rounded and saturated to store in the 20-bit fixed point format. By doing this, these coefficients have one more bit precision. The decoder software will add the subtracted one back during the decoding process.

Figure 3:
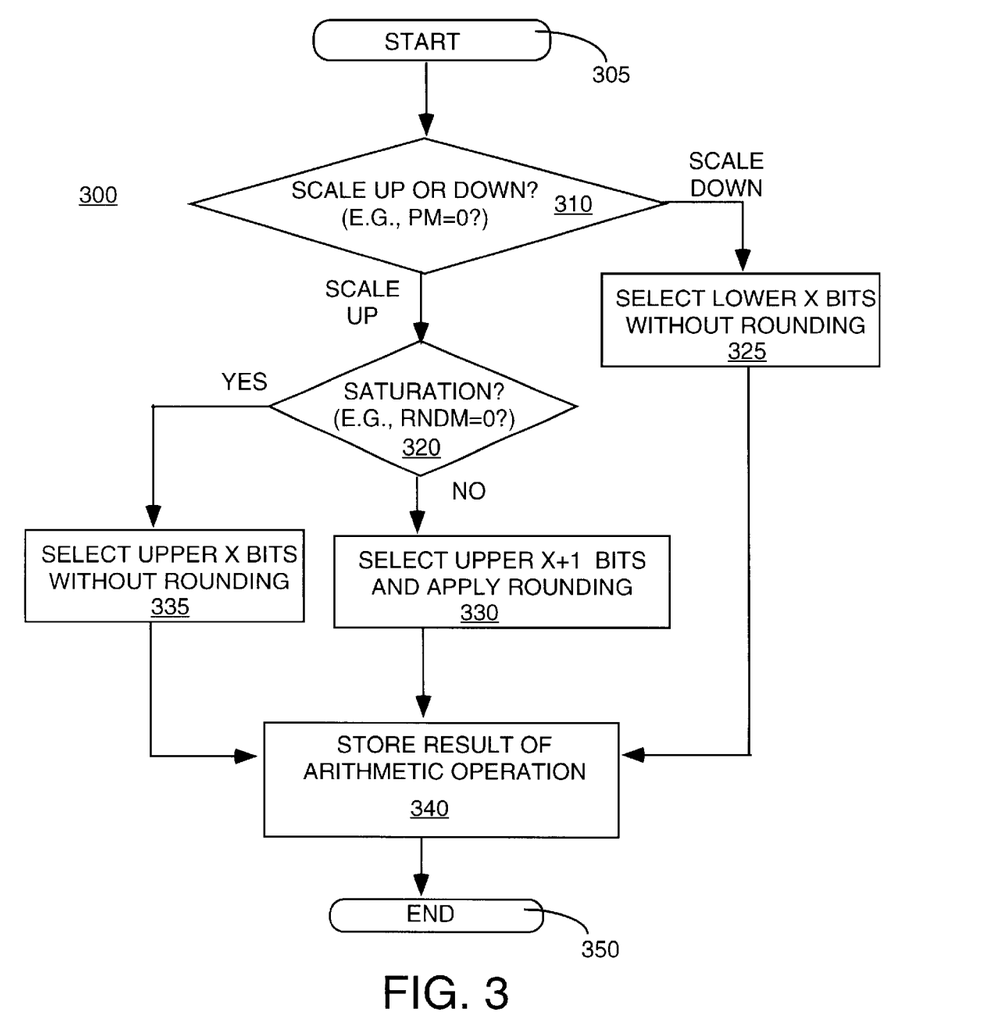
FIG. 3 illustrates a flowchart of a method for scaling a number having a word-width greater than "x" down to a number having a word-width of "x"

FIG. 3 depicts a flowchart of a method 300 for scaling and rounding a number having a word-width greater than "x" down to a number having a word-width of "x". More specifically, method 300 discloses a method of applying scaling and rounding to various arithmetic or shifting operations to reduce the loss of precision in the reproduced audio signal of an audio decoder.

More specifically, method 300 starts in step 305 and proceeds to step 310, where method 300 queries whether the scaling operation involves scaling up or scaling down of a result T. Namely, scaling down denotes the selection of "x" number of the LSBs from the result T and scaling up denotes the selection of "x" number of the MSBs from the result T. Various factors are evaluated to control the scaling operation, e.g., the dynamic range of the operands and whether the arithmetic operation involves integers or non-integers.

If the scaling operation involves scaling down, method 300 proceeds to step 325, where the "x" LSBs are selected and rounding is not applied, i.e., setting PM=0. If the scaling operation involves scaling up, method 300 proceeds to step 320.

In step 320, method 300 queries whether the "x" MSBs are saturated. If the query is positively answered, then method 300 proceeds to step 335, where the "x" MSBs are selected and rounding is not applied, i.e., setting PM=1 and RNDM=0. If the query is negatively answered, then method 300 proceeds to step 330, where the "x+1" MSBs are selected and rounding is applied, i.e., setting PM=1 and RNDM=1. Although the present invention evaluates the "x+1" MSBs for the purpose of implementing rounding, additional MSBs can be optionally employed, e.g., "x+2" MSBs, "x+3" MSBs and so on.

Finally, in step 340, the selected bits from step 325, step 330, or step 335 are stored, e.g., in memory. Method 300 then ends in step 350.

Thus, a novel method of increasing the precision of an audio decoder has been described. An important aspect of the present invention is the ability to selectively apply a rounding method when necessary. This rounding method increases overall precision and accuracy of the audio decoder while minimizing hardware cost or software complexity, thereby achieving higher precision using a lower cost implementation.

Although various embodiments which incorporate the teachings of the present invention have been shown and described in detail herein, those skilled in the art can readily devise many other varied embodiments that still incorporate these teachings.

What is claimed is:

1. A method for increasing the precision of an audio decoder, wherein said audio decoder employs a processor having a data word-width of x-bits for performing arithmetic operations to decode an encoded audio signal, said method comprising the steps of:

(a) scaling up or down a result of an arithmetic operation, where said result is representative of said encoded audio signal;

(b) selecting at least x+1 most significant bits from said result if said scaling up is applied; and (c) rounding said at least x+1 most significant bits to an x-bit result, where said rounded result increases the precision of the audio decoder.

2. The method of claim 1, further comprising the step of:

(a') determining whether a saturation condition exists prior to performing said selecting step (b), wherein said selecting step (b) only selects the x most significant bits from said result and said rounding step (c) is omitted, if said saturation condition is detected.

3. The method of claim 2, wherein said processor has a data word-width of 20-bits, and wherein said selecting step (b) selects at least 21 most significant bits from said result if said scaling up is applied, and wherein said rounding step (c) rounds said at least 21 most significant bits to an 20-bit result.

4. The method of claim 2, wherein said saturation determining step (a') further stores a result from said saturation determining step into a register.

5. A method for increasing the precision of an audio decoder, wherein said audio decoder employs a processor for performing shifting operations to decode an encoded audio signal, said method comprising the steps of:

(a) shifting a result by "n−1" number of bits to obtain a shifted result, where said result is representative of an audio signal and said "n" is a number of bits that need to be shifted;

(b) adding a value of one to said shifted result to obtain a modified shifted result; and (c) rounding said modified shifted result by shifting one bit of said modified shifted result, where said rounded result increases the precision of the audio decoder.

6. The method of claim 5, further comprising the step of:

(a') determining whether a saturation condition exists prior to performing said adding step (b), wherein said adding step (b) is omitted and said rounding step (c) rounds said shifted result by shifting one bit of said shifted result, if said saturation condition is detected.

7. The method of claim 6, wherein said processor has a data word-width of 20-bits.

8. An audio decoder for increasing the precision of a decoded audio signal, said audio decoder comprising:

means for scaling up or down a result of an arithmetic operation, where said result is representative of said encoded audio signal;

means for selecting at least x+1 most significant bits from said result if said result is scaled up; and means for rounding said at least x+1 most significant bits to an x-bit result, where said rounded result increases the precision of the decoded audio signal.

9. The audio decoder of claim 8, further comprising:

means for determining whether a saturation condition exists for said scaled result.

10. The audio decoder of claim 8, wherein said plurality of means are implemented using a processor having a data word-width of 20-bits.

11. A computer-readable medium having stored thereon a plurality of instructions, the plurality of instructions including instructions which, when executed by a processor, cause the processor to perform the steps comprising of:

(a) scaling up or down a result of an arithmetic operation, where said result is representative of said encoded audio signal;

(b) selecting at least x+1 most significant bits from said result if said scaling up is applied; and (c) rounding said at least x+1 most significant bits to an x-bit result, where said rounded result increases the precision of the audio decoder.

12. The computer-readable medium of claim 11, further comprising the step of:

(a') determining whether a saturation condition exists prior to performing said selecting step (b), wherein said selecting step (b) only selects the x most significant bits from said result and said rounding step (c) is omitted, if said saturation condition is detected.

13. The computer-readable medium of claim 12, wherein said processor has a data word-width of 20-bits, and wherein said selecting step (b) selects at least 21 most significant bits from said result if said scaling up is applied, and wherein said rounding step (c) rounds said at least 21 most significant bits to an 20-bit result.

14. The computer-readable medium of claim 12, wherein said saturation determining step (a') further stores a result from said saturation determining step into a register.

* * * * *

UNITED STATES PATENT AND TRADEMARK OFFICE
CERTIFICATE OF CORRECTION

PATENT NO.    : 6,360,204 B1
DATED         : March 19, 2002
INVENTOR(S)   : Li et al.

It is certified that error appears in the above-identified patent and that said Letters Patent is hereby corrected as shown below:

Column 6,
Line 12, please replace " +2^0**P19" with -- +2^0*P19 --.

Signed and Sealed this

Tenth Day of December, 2002

JAMES E. ROGAN
*Director of the United States Patent and Trademark Office*